United States Patent Office 3,573,032
Patented Mar. 30, 1971

3,573,032
HERBICIDAL COMPOSITION AND METHOD
Josef Fellig, Glen Rock, and Benjamin Pecherer, Montclair, N.J., assignors to Hoffmann-La Roche Inc., Nutley, N.J.
No Drawing. Original application Mar. 30, 1967, Ser. No. 626,983, now Patent No. 3,489,784, dated Jan. 13, 1970. Divided and this application July 16, 1969, Ser. No. 842,357
Int. Cl. A01n 9/24; C07c 121/66
U.S. Cl. 71—115                    4 Claims

ABSTRACT OF THE DISCLOSURE

Herbicidal compounds of the formula

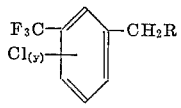

wherein R is either —CN, —CONH$_2$ or —COOH and y is either 0 or 1 and the chlorine is either ortho or para to either the —CF$_3$ or —CH$_2$R group
useful as selective pre-emergent herbicides.

RELATED APPLICATIONS

This application is a divisional application of United States patent application Ser. No. 626,983 filed Mar. 30, 1967, now U.S. Pat. No. 3,489,784.

BRIEF SUMMARY OF THE INVENTION

This invention relates to novel herbicidal compositions containing novel compounds as active ingredients and methods for selectively controlling plant growth with such herbicidal compositions.

DETAILED DESCRIPTION OF THE INVENTION

This invention provides novel herbicidal compositions containing as the active ingredients chemical compounds represented by the general formula

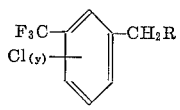

I wherein R is selected from the group consisting of

—CN, —CONH$_2$ and —COOH; y is either 0 or 1 and the chlorine substituent, when present, is ortho or para to either the —CF$_3$ or —CH$_2$R group.

The compounds represented by Formula I have herbicidal activity, particularly pre-emergence herbicidal activity of a hormonal type with good species differentiation. The compounds within the scope of this invention which display the broadest herbicidal activity and show the most advantageous ratio of crop to weed effectiveness with the largest variety of plants and thus are the preferred compounds of this invention are selected from the group consisting of compounds represented by the following structural formulae

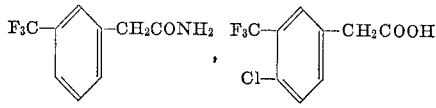

and

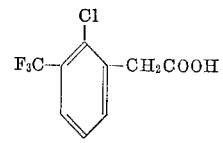

The compounds within the scope of Formula I are useful as intermediates in the production of other useful compounds as well as herbicides as is apparent from the following reaction scheme depicting the process for producing compounds of this invention.

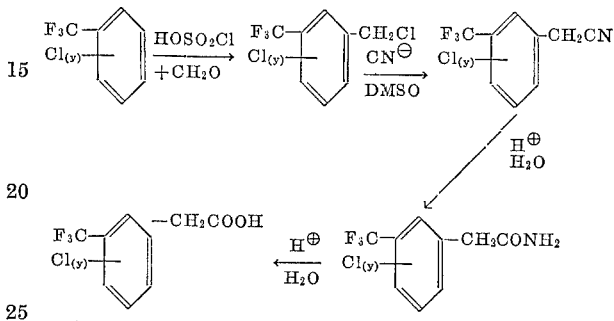

As shown in this reaction scheme, the compounds of this invention are prepared by reacting the appropriate trifluoromethyl aryl with chlorosulfonic acid and paraformaldehyde to form the corresponding benzyl halide with the —CH$_2$Cl group meta to the CF$_3$ group and either ortho or para to the chlorine substituent, when present. Novel benzyl halides formed as a result of this reaction and thus within the scope of this invention are those corresponding to the following formula

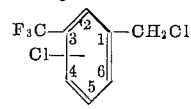

II wherein the chlorine is in the 4 or 6 position.

The —CH$_2$Cl group is then reacted with alkali metal cyanide and hydrolysis of the resulting nitrile yields the corresponding amide or carboxylic acid depending upon the conditions of the hydrolysis. The nitriles may be prepared from sodium cyanide and the appropriate benzyl chloride in aqueous acetone, dimethylformamide (DMF) or dimethylsulfoxide (DMSO) as a reaction medium. In aqueous acetone the reaction proceeds very slowly, in DMF a 40 to 50 percent yield is obtained in about 5 hours at from 60 to 70° C. In DMSO a 60 to 80 percent yield is obtained in 1 to 2 hours at 80° C. with no unreacted benzyl halide remaining. Because of the high yields and short reaction times, DMSO is the preferred reaction medium. The partial hydrolysis of the nitrile to the corresponding amide is carried out in acid medium. The complete hydrolysis of the nitrile to the corresponding carboxylic acid can be carried out in either acid or basic medium.

Compounds containing the nitriles, amides and carboxylic acids produced according to this invention are useful in controlling the growth of undesired plants, for example, the compositions can be applied to crop seeded fields to kill weeds as well as undesired plants which inadvertently become mixed in with the desired crops. The compositions are used particularly for pre-emergent control, requiring the application of only small amounts of the active ingredient distributed uniformly over a wide area. In order to effect such uniform distribution of the active ingredients of the novel herbicidal compositions according to the present invention, the pure active materials can be mixed with conventional pest control and herbicide adjuvants, modifiers, diluents or conditioning agents so that they may be formulated as solutions, emulsions, dispersions, dusts or wettable powders.

Liquid formulations of the active compounds according to the present invention for direct spraying may be made, for example, with water, petroleum fractions, liquid aliphatic or aromatic alcohols, esters, glycols or ketones and the like. These liquid formulations can be solutions, dispersions, emulsions or wettable powder dispersion and, if needed, may contain surface active agents, e.g., wetting agents, dispersing agents, emulsifying agents and the like, in sufficient amounts to impart the desired characteristics to the formulation.

Aqueous formulations, for example, can be made by adding water to emulsion concentrates, pastes or wettable spray powders of the active ingredients. The wetting, emulsifying or dispersing agents may be either anionic, cationic, non-ionic or mixtures thereof. Suitable wetting agents are the organic compounds capable of lowering the surface tension of water and include the conventional soaps such as the water-soluble salts of long-chain carboxylic acids; the amine soaps, such as amine salts of long-chain carboxylic acids, the sulfonated animal, vegetable and mineral oils; quaternary salts of high molecular weight acids; rosin soaps such as salts of abietic acid, sulfuric acid salts of high molecular weight organic compounds; algin soaps; and simple and polymeric compositions having both hydrophobic and hydrophilic functions.

Dusts may be prepared by mixing or grinding of the active substance with a solid carrier material such as talc, diatomaceous earth, kaolin, bentonite, calcium carbonate, boric acid, calcium phosphate, wood, flour, cork, dust, carbon and the like. Scatterable granules may be obtained, for example, by using ammonium sulfate as carrier material. Alternatively, carrier materials may be impregnated with solutions of the active substances in liquid solvents. Powder preparations or pastes which can be suspended in water and used as sprays may be obtained by adding wetting agents and protective colloids. Different forms of application may be better adapted to the various purposes for which the active substances are to be used by the addition of substances which improve dispersion, adhesion, resistance to rain, and penetrative power such as fatty acids, resins, wetting agents, emulsifying agents, glue and the like. Similarly, the biological spectrum may be broadened by the addition of substances having bactericidal, fungicidal and plant growth regulating properties and also by combination with fertilizers.

The amount of active ingredient in the herbicidal compositions of this invention varies according to the application rates, type of application and activity required. Generally, the compositions contain less than 50 percent active compound.

In order to get the greatest pre-emergence herbicidal activity, application rates of from 0.5 pound to 10 pounds or more per acre are required, based upon the weight of the active ingredient. It will be appreciated, of course, that all of the compounds defined by Formula I are not active against all of the crops and weeds. However, each of the active compounds within the scope of this invention is active against a specific crop or crops and specific weed or weeds. As will be seen hereinafter, one advantage of this invention is that it provides a series of compositions which when applied to various crop and/or weed seeds supplies pre-emergence herbicidal activity and controls the growth of a wide spectrum of plants.

The active ingredients of the herbicidal compositions of this invention are prepared in accordance with the following examples in which temperatures are ° C. and "paraformaldehyde" means a solid, high molecular weight polyoxymethylene resulting from either (1) the evaporation of an aqueous formaldehyde solution or (2) the acid treatment of alcoholic formaldehyde, which may be represented by the formula:

$$R(OCH_2)_nOR$$

wherein R is either hydrogen [when obtained by process (1)] or an alchohol residue, especially lower alkyl, such as methyl or ethyl [when obtained by process (2)]; and $n$ is normally in the range of from about 40 to about 400.

All melting points are corrected and boiling points are uncorrected.

EXAMPLE 1

(a) A 12-liter round-bottom flask, equipped with stirrer, thermometer, dropping funnel and gas vent provided with a drying tube was charged with 2920 grams of $\alpha,\alpha,\alpha$-trifluorotoluene and 780 grams of flake paraformaldehyde. While maintaining the reaction mixture at 0–2° C., there was added, with vigorous stirring 2330 grams of chlorosulfonic acid over a 5-hour period. After stirring at 0–2° C. for an additional 18 hours, the reaction mixture was poured into a separatory funnel and the lower acid layer was separated. The organic layer was washed first with water and then with saturated sodium bicarbonate solution, dried over anhydrous sodium sulfate and filtered. Distillation of the filtrate yielded 1584 grams of crude product boiling at 30° C./23 mm. to 120° C./12 mm. and having an index of refraction, $n_D^{25}=1.4509$. On redistillation, there was recovered $\alpha_1$-chloro-$\alpha_3,\alpha_3,\alpha_3$-trifluoro-m-xylene, boiling at 68–70° C./12 mm. having an index of refraction, $n_D^{25}=1.4605$.

(b) In a 2-liter round-bottom flask provided with a stirrer, thermometer and reflux condenser topped by a drying tube were placed 583.5 g. (3.0 moles) of $\alpha_1$-chloro-$\alpha_3,\alpha_3,\alpha_3$-trifluoro-m-xylene, 186.2 g. (3.8 moles) of sodium cyanide and 1030 ml. of dimethylformamide. The temperature of the stirred mixture rose to 75° in the next twenty minutes and was maintained there for 22.5 hours. After this time, the cooled mixture was poured into cold water and the oil that had separated removed. The aqueous phase was extracted twice with 250 ml. portions of ether, the combined oil and ether extracts washed several times with water, dried, then distilled using a 12" column filled with single turn glass helices. The fraction boiling at 90–112°/12 mm., had a refractive index $n_D^{23}=1.4550$. This fraction was redistilled at 112–118°/14 mm., yielding 2-($\alpha,\alpha,\alpha$-trifluoro-m-tolyl)acetonitrile with an index of refraction $n_D^{24}=1.4554$–1.4558.

(c) A mixture of 37 g. (0.2 mole) of 2-($\alpha,\alpha,\alpha$-trifluoro-m-tolyl)acetonitrile and 94 ml. of concentrated hydrochloric acid was stirred until the internal temperature rose to 42–44°. The mixture was maintained at 40° and stirred for a total of 1 hour, then diluted with 94 ml. of water and cooled to room temperature. The amide, 2-($\alpha,\alpha,\alpha$-trifluoro-m-tolyl)acetamide, was collected by three 100 ml. extractions with benzene. The benzene solution was washed successively with water, saturated bicarbonate solution, water, then dried and the solvent removed yielding a white solid.

For purification, the amide was dissolved in 50 ml. of hot ethyl acetate and diluted with hot 60–90° petroleum ether to turbidity (approximately 10 volumes) and the solution allowed to cool to room temperature. The amide separated as cottony needles, that melted at 105–107°.

EXAMPLE 2

(a) Employing procedures similar to those described in Example 1, o-chloro-$\alpha,\alpha,\alpha$-trifluorotoluene was reacted with para-formaldehyde and chlorosulfonic acid. After workup of the reaction mixture and distillation, there was obtained a major fraction boiling at 91–110° C./8 mm., $n_D^{25}=1.4933$. Upon redistillation the product boiled at 95–97° C./10 mm. and had an index of refraction, $n_D^{25}=1.4947$–1.4951 and was found to be a mixture of 2,$\alpha_1$-dichloro-$\alpha_3,\alpha_3,\alpha_3$-trifluoro-m-xylene and 4,$\alpha_1$-dichloro-$\alpha_3,\alpha_3,\alpha_3$-trifluoro-m-xylene in a ratio of about 1:9. These isomers were separated by vapor phase chromatography.

(b) In a 1-liter, round-bottom flask provided with a stirrer, thermometer and reflux condenser topped by a drying tube were placed 229 grams of the 1:9 mixture prepared in (a), 61.2 grams (1.25 moles) of NaCN and 450 ml. of DMSO with stirring, the temperature of the mixture rose to 80° and was maintained for 80 minutes. The mixture was cooled to room temperature and poured into cold water. The oil portion was removed and the aqueous phase was extracted twice with 125 ml. portions of ether. The ether extracts and oil portion were combined and washed several times with water, dried, then distilled using a 12″ column filled with single turn glass helices yielding a mixture of two isomers. There was obtained upon redistillation 2-(2-chloro-$\alpha,\alpha,\alpha$-trifluoro-m-tolyl)acetonitrile with a melting point of 57–60° and a boiling point of 132–135°/12 mm. and 2-(4-chloro-$\alpha,\alpha,\alpha$-trifluoro-m-tolyl)acetonitrile with a boiling point of 140–142°/9 mm., M.P. 37.5–39°.

(c) 44 grams (0.2 mole) of 2-(2-chloro-$\alpha,\alpha,\alpha$-trifluoro-m-tolyl)acetonitrile was stirred with 94 ml. of concentrated hydrochloric acid at 40° for approximately one hour, after which time 94 ml. of water was added and the white solid which had formed was filtered off and washed with water. The solid was dried in a vacuum desiccator over calcium chloride and solid potassium hydroxide. The white crystalline product, 2-(2-chloro-$\alpha,\alpha,\alpha$-trifluoro-m-tolyl)acetamide, was recrystallized from aqueous ethanol to yield a product with a melting point of 154–157.5°.

(d) The amide from the preceding was hydrolyzed to the acid by dissolving in ethanol and refluxing for 20 hours with a 10 percent NaOH solution. This was then acidified to yield a white crystalline product. The product, 2-chloro-$\alpha,\alpha$-trifluoro-m-tolyl acetic acid, was recrystallized from aqueous methanol twice to yield a product with a melting point of 131–133°.

EXAMPLE 3

(a) 44 grams (0.2 mole) of 2-(4-chloro-$\alpha,\alpha,\alpha$-trifluoro-m-tolyl)acetonitrile was stirred with 94 ml. of concentrated hydrochloric acid at 40° for approximately one hour, after which time 94 ml. of water was added and the white solid which had formed was filtered off and washed with water. The solid was dried in a vacuum desiccator over calcium chloride and solid potassium hydroxide. The white crystalline product, 2-[4-chloro-3-(trifluoromethyl)phenyl]acetamide, was recrystallized from aqueous ethanol and melted at 135–138°.

(b) 23.5 g. of 2-[4-chloro-3-(trifluoromethyl)phenyl] acetamide were dissolved in ethanol and refluxed for 6 hours with 47 g. of concentrated hydrochloric acid and 47 g. of water. On cooling, crystals separated from the mixture; these were filtered off and washed with a little water. After recrystallization from aqueous ethanol, the solid melted at 79–105°. Repeated recrystallization showed that the product consisted of two polymorphic forms, one melting at about 83–85° and another at about 120–125°. Both of these forms were readily interconvertible and invariably both separated from solution even if pure seed crystals of each were used. Nevertheless, the material of broad melting point showed the correct composition for the 4-chloro-3-(trifluoromethyl)phenyl acetic acid product.

EXAMPLE 4

(a) A creased flask was charged with 361 grams of p-chloro-$\alpha,\alpha,\alpha$-trifluorotoluene and 78 grams of para-formaldehyde flakes. While maintaining the reaction temperature at 25° C., there was added 234 grams of chlorosulfonic acid over 2 hours with stirring. After stirring the mixture for an additional 22–24 hours at 25° C., the lower acid layer was separated and discarded. Anhydrous potassium carbonate was added to the organic layer and the resulting mixture was allowed to stand for 2 hours. After filtration and fractionation, there was obtained a fraction boiling at 90–120° C./18–19 mm., $n_D^{25}=1.4871$. After refractionation of this crude product, there was obtained 6,$\alpha_1$-dichloro-$\alpha_3,\alpha_3,\alpha_3$-trifluoro-m-xylene boiling at 98–100° C./21 mm., $n_D^{25}=1.4871$.

(b) 69 g. (0.3 mole) of 6,$\alpha_1$-dichloro-$\alpha_3,\alpha_3,\alpha_3$-trifluoro-m-xylene was heated with 24 grams of KCN (0.36 mole) in 100 ml. of dimethylformamide at 70° for 4.5 hours. The reaction mixture was then cooled to room temperature and diluted with water. The product was extracted with benzene, washed, dried and distilled. Upon redistillation, a colorless liquid, 2-(6-chloro-$\alpha,\alpha,\alpha$-trifluoro-m-tolyl)acetonitrile, was collected, boiling point 124–125°/10 mm., $n_D^{25}=1.4820$.

(c) 44 g. (0.2 mole) of 2-(6-chloro-$\alpha,\alpha,\alpha$-trifluoro-m-tolyl)acetonitrile was stirred with 94 ml. of concentrated hydrochloric acid at 40° for about one hour, then 94 ml. of water were added. A white crystalline material formed which was recovered and washed with water, then dried. The product, 2-(6-chloro-$\alpha,\alpha,\alpha$-trifluoro-m-tolyl) acetamide, was recrystallized from petroleum ether and had a melting point of 151–153°.

(d) 23.5 grams of 2-(6-chloro-$\alpha,\alpha,\alpha$-trifluoro-m-tolyl) acetamide were dissolved in ethanol and refluxed for six hours with 47 grams of concentrated hydrochloric acid and 47 ml. of water. On cooling, crystals separated from the mixture. The crystals were recovered, washed with water and recrystallized from petroleum ether. White crystals of 2-(6-chloro-$\alpha,\alpha,\alpha$-trifluoro-m-tolyl)acetic acid were recovered and had a melting point of 112–115°.

EXAMPLE 5

Selective pre-emergence herbicidal activity of the active ingredients of the compositions of the instant invention is exemplified by the following tests wherein seeds of a variety of crop plants and weeds are mixed into potting soil and planted on top of approximately two inches of potting soil in disposable 4 x 4 in. plastic cups, one plant species to a cup, approximately 24 hours prior to the application of the test compounds.

The herbicidal active ingredients are applied to the plants in a liquid vehicle. The solution is prepared by dissolving the active ingredients to be tested in acetone, methanol, ethanol or another suitable solvent and diluted with sufficient water containing a surface active agent such as Span 85 (fatty acid partial esters of a mixture of hexitans and hexides), Atlas Chemical Company, at 500 p.p.m. or Tween 20 (polyoxyethylene sorbitan monostearate), Atlas Chemical Company, at 50 p.p.m. to provide the desired concentration of test compound, i.e., equivalent to 0.5, 1.0, 2.0, 5.0 or 10.0 pounds per acre when the prepared solutions are sprayed at an application rate equivalent to 40 gallons per acre. The solutions are sprayed onto the soil in the seeded cups which are then placed on greenhouse benches. Emergence and growth of the seedlings is observed regularly for a period of two weeks after which time the test is terminated and the results evaluated.

The results of the tests are provided in Table I wherein the herbicidal injury rating is set forth numerically. The ratings code is as follows: 0—no visible effect; 1, 2, 3—slight injury, plant usually recovered with little or no reduction in top growth; 4, 5, 6—moderate injury, plants usually recovered, but with reduced top growth; 7, 8, 9—severe injury, plants usually did not recover; 10—all plants killed.

TABLE I.—PRE-EMERGENCE HERBICIDAL ACTIVITY

| Compound | Rate lbs./acre | Sugar beets | Corn | Oats | Clover | Soy-beans | Cot-ton | Mus-tard | Yellow foxtail | Barnyard grass | Crab-grass | Buck-wheat | Morning glory |
|---|---|---|---|---|---|---|---|---|---|---|---|---|---|
|  -CH₂CN | 5<br>2<br>1 | 8<br>5<br>0 | 6<br>3<br>0 | 4<br>0<br>0 | 9<br>7<br>5 | 6<br>0<br>0 | 7<br>7<br>0 | 10<br>9<br>7 | 7<br>5<br>5 | 7<br>5<br>5 | 9<br>8<br>5 | 6<br>5<br>0 | 10<br>7<br>5 |
|  -CH₂CONH₂ | 10<br>5<br>2<br>1<br>0.5 | 10<br>10<br>8<br>0<br>0 | 9<br>6<br>0<br>0<br>0 | 6<br>4<br>0<br>0<br>0 | 9<br>9<br>8<br>5<br>5 | 10<br>9<br>0<br>0<br>0 | 9<br>10<br>7<br>0<br>0 | 10<br>10<br>9<br>9<br>8 | 8<br>6<br>8<br>7<br>5 | 9<br>6<br>7<br>5<br>5 | 10<br>9<br>8<br>6<br>9 | 9<br>8<br>0<br>0<br>0 | 10<br>10<br>10<br>9<br>6 |
|  -CH₂CN | 5<br>2<br>1 | 8<br>6<br>3 | 0<br>0<br>0 | 0<br>0<br>0 | 9<br>9<br>5 | 5<br>0<br>0 | 9<br>9<br>0 | 9<br>10<br>8 | 7<br>8<br>5 | 7<br>6<br>0 | 9<br>8<br>6 | 0<br>0<br>0 | 5<br>8<br>0 |
|  -CH₂CONH₂ | 5<br>2<br>1 | 10<br>8<br>5 | 9<br>0<br>0 | 5<br>0<br>0 | 9<br>8<br>8 | 10<br>7<br>5 | 10<br>10<br>0 | 10<br>10<br>10 | 8<br>8<br>8 | 9<br>8<br>6 | 10<br>10<br>8 | 8<br>8<br>0 | 10<br>9<br>4 |
|  -CH₂COOH | 10<br>5<br>2<br>1<br>0.5 | 9<br>9<br>7<br>0<br>0 | 5<br>6<br>0<br>0<br>0 | 3<br>3<br>0<br>0<br>0 | 10<br>9<br>8<br>7<br>6 | 10<br>9<br>8<br>0<br>7 | 10<br>10<br>0<br>0<br>0 | 10<br>10<br>10<br>10<br>9 | 10<br>7<br>8<br>7<br>5 | 10<br>8<br>6<br>6<br>5 | 10<br>10<br>9<br>8<br>9 | 5<br>8<br>0<br>0<br>0 | 10<br>10<br>8<br>5<br>0 |
|  -CH₂CN | 5 | 3 | 3 | 0 | 5 | 1 | 0 | 9 | 0 | 5 | 5 | 0 | 3 |
|  -CH₂CONH₂ | 5<br>2<br>1 | 8<br>6<br>4 | 5<br>0<br>0 | 2<br>0<br>0 | 6<br>4<br>4 | 5<br>0<br>0 | 10<br>0<br>0 | 9<br>9<br>8 | 5<br>6<br>5 | 5<br>4<br>0 | 5<br>8<br>5 | 3<br>0<br>0 | 6<br>0<br>0 |
|  -CH₂COOH | 10<br>5<br>2<br>1<br>0.5 | 9<br>6<br>5<br>2<br>0 | 5<br>7<br>0<br>0<br>0 | 0<br>3<br>0<br>0<br>0 | 10<br>9<br>5<br>8<br>3 | 0<br>10<br>0<br>0<br>0 | 7<br>10<br>0<br>0<br>0 | 10<br>10<br>10<br>10<br>5 | 8<br>6<br>7<br>5<br>5 | 8<br>6<br>4<br>3<br>5 | 10<br>7<br>8<br>7<br>5 | 0<br>3<br>0<br>0<br>0 | 10<br>10<br>5<br>5<br>0 |
|  -CH₂CN | 5 | 3 | 5 | 0 | 5 | 5 | 7 | 7 | 0 | 0 | 0 | 0 | 5 |
|  -CH₂CONH₂ | 5<br>2<br>1 | 8<br>7<br>5 | 7<br>0<br>0 | 3<br>0<br>0 | 9<br>8<br>7 | 9<br>0<br>0 | 9<br>0<br>0 | 9<br>10<br>8 | 8<br>7<br>6 | 9<br>0<br>0 | 8<br>7<br>6 | 5<br>0<br>0 | 8<br>4<br>0 |
|  -CH₂COOH | 5<br>2<br>1 | 8<br>6<br>4 | 8<br>0<br>0 | 4<br>0<br>0 | 9<br>8<br>9 | 10<br>5<br>0 | 10<br>7<br>0 | 9<br>8<br>5 | 7<br>7<br>5 | 7<br>0<br>0 | 8<br>7<br>5 | 8<br>0<br>0 | 9<br>0<br>0 |

It will be noted from an examination of the data that the compounds of this invention have selective pre-emergence herbicidal activity at various application rates.

We claim:
1. A herbicidal composition comprising a herbicidal adjunct and as the active ingredient, a herbicidally effective amount of a compound of the formula

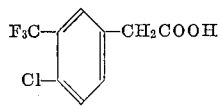

2. A herbicidal composition comprising a herbicidal adjunct and as the active ingredient, a herbicidally effective amount of a compound of the formula

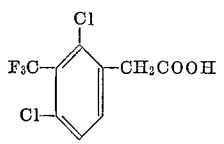

3. A method of controlling undesirable plant growth by pre-emergent treatment which comprises applying to the area to be protected a herbicidally effective amount of the compound of the formula

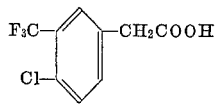

4. A method of controlling undesirable plant growth by pre-emergent treatment which comprises applying to the area to be protected a herbicidally effective amount of the compound of the formula

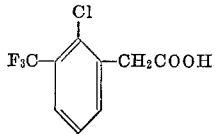

References Cited

UNITED STATES PATENTS

| 3,465,051 | 9/1969 | Pecherer | 260—646 |
| 3,148,189 | 9/1964 | Doran | 260—257 |

FOREIGN PATENTS

| 1,021,014 | 2/1966 | Great Britain | 71—103 |

OTHER REFERENCES

Plant Regulators, National Academy of Sciences, CBCC Positive Data Series No. 2, 1955, pp. a, b, c, 1 and 12.

JAMES O. THOMAS, JR., Primary Examiner

U.S. Cl. X.R.

71—105, 118

PO-1050
(5/69)

UNITED STATES PATENT OFFICE
CERTIFICATE OF CORRECTION

Patent No. __3,573,032__  Dated __March 30, 1971__

Inventor(s) __Fellig and Pecherer__

It is certified that error appears in the above-identified patent and that said Letters Patent are hereby corrected as shown below:

Column 8, line 70

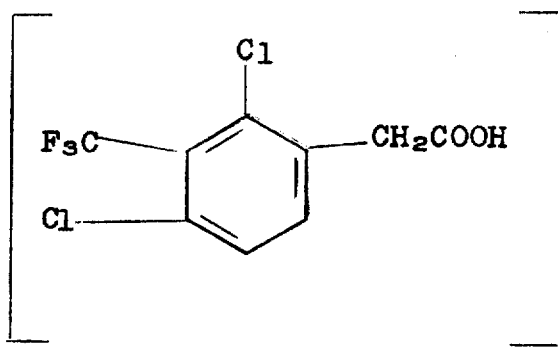

should be

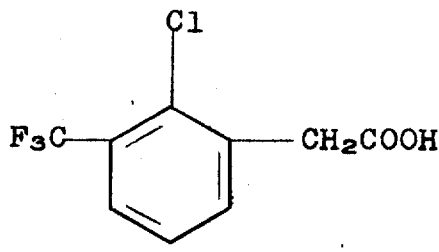

Signed and sealed this 10th day of August 1971.

(SEAL)
Attest:

EDWARD M. FLETCHER, JR.
Attesting Officer

WILLIAM E. SCHUYLER, JR.
Commissioner of Patents